United States Patent [19]
Kromer et al.

[11] Patent Number: 5,920,521
[45] Date of Patent: Jul. 6, 1999

[54] ULTRASOUND AREA SURVEILLANCE SYSTEM

[75] Inventors: Siegfried Kromer, Sonnenbuehl-Genkingen, Germany; Heinz Kremser, Graz-St. Veit, Austria

[73] Assignee: Mayser GmbH & Co., Germany

[21] Appl. No.: 08/981,270

[22] PCT Filed: Apr. 16, 1997

[86] PCT No.: PCT/EP97/01894

§ 371 Date: Mar. 5, 1998

§ 102(e) Date: Mar. 5, 1998

[87] PCT Pub. No.: WO97/40402

PCT Pub. Date: Oct. 30, 1997

[30] Foreign Application Priority Data

Apr. 19, 1996 [DE] Germany .......................... 196 15 548

[51] Int. Cl.⁶ ................................................ B60Q 1/00
[52] U.S. Cl. ............................................ 367/93; 340/435
[58] Field of Search ............................ 367/93; 340/541, 340/514, 516, 506, 426, 435, 436, 903

[56] References Cited

U.S. PATENT DOCUMENTS

| | | | |
|---|---|---|---|
| 4,225,951 | 9/1980 | Menin et al. ........................ | 367/93 X |
| 4,380,808 | 4/1983 | Hill et al. ............................ | 367/153 |
| 4,414,654 | 11/1983 | Hill et al. ............................ | 367/103 |
| 4,636,996 | 1/1987 | Tsuji .................................... | 367/93 |
| 4,658,385 | 4/1987 | Tsuji .................................... | 367/105 |
| 4,980,869 | 12/1990 | Forster et al. ...................... | 367/99 |
| 5,059,946 | 10/1991 | Hollowbush ....................... | 340/435 |
| 5,455,557 | 10/1995 | Noll et al. .......................... | 340/436 X |
| 5,531,118 | 7/1996 | Knoll et al. ........................ | 73/628 |

FOREIGN PATENT DOCUMENTS

| | | |
|---|---|---|
| 0 312 849 | 4/1989 | European Pat. Off. . |
| 0 326 623 | 8/1989 | European Pat. Off. . |
| 35 18 590 | 11/1985 | Germany . |
| 35 18 613 | 11/1985 | Germany . |
| 39 16 396 | 11/1990 | Germany . |
| 43 03 815 | 8/1994 | Germany . |
| 43 38 743 | 5/1995 | Germany . |
| 256 077 | 12/1985 | Japan .................................. 367/93 |
| 83 682 | 4/1987 | Japan .................................. 367/93 |
| 235 885 | 9/1989 | Japan .................................. 367/93 |
| 2 077 552 | 12/1981 | United Kingdom . |

OTHER PUBLICATIONS

Naoya et al., "Monitor for Perimeter of Vehicle", *Patent Abstracts of Japan*, Pub. No. 60152967, Dec. 1985.

*Primary Examiner*—Thomas Mullen
*Attorney, Agent, or Firm*—Evenson, McKeown, Edwards & Lenahan, P.L.L.C.

[57] ABSTRACT

An ultrasound area surveillance system has a plurality of ultrasonic transducer units, each of which is designed for directional radiation of an ultrasonic wave field and for the reception of reflected ultrasonic waves. An analysis device analyzes the reflected ultrasonic waves received by the ultrasonic transducer units to detect objects situated within a predeterminable surveillance area. The ultrasonic transducer units are arranged closely adjacently, with their radiation directions extending outwardly in a fan-shaped manner. The transducer units may be arranged, for example, in a semicircular array, in two planes situated above one another.

4 Claims, 2 Drawing Sheets

ULTRASOUND AREA SURVEILLANCE SYSTEM

BACKGROUND AND SUMMARY OF THE INVENTION

This application claims the priority of German patent document 196 15 548.7, the disclosure of which is expressly incorporated by reference herein.

The invention relates to an ultrasound area surveillance system of the type used, for example, for monitoring the surroundings of vehicles to detect obstacles, or for monitoring the vehicle interior as a protection against theft.

In an area surveillance system of this type described in European Published Patent Application EP 0 326 623 A1, four ultrasonic transducer units are distributed along the front of an unmanned vehicle in a straight row at a considerable distance from one another. Directionally radiated ultrasonic wave fields from these transducers form detection lobes which extends toward the front of the vehicle, and can be used to detect obstacles which occur there. The radiating directions of the various transducer units are essentially parallel to one another, so that the width of the lobar detection area is not much larger than the distance of the exterior transducer units from one another.

For applications in which an approximately semicircular area is to be monitored, it is known to use a laser beam area surveillance system, which scans the desired detection area by means of a rotating laser beam. A system of this type is sold, for example, by the firm Leuze Electronic under the name rotoScan RS 3.

One object of the invention is to provide an ultrasound area surveillance system of the initially mentioned type which can monitor an approximately semicircular area as uniformly and completely as possible, at comparatively low cost.

The invention achieves this object by providing an ultrasound area surveillance system in which the ultrasonic transducer units are arranged in a closely adjacent manner, with their radiation directions extending to the outside in a fan shape. In this arrangement, the maximal width of the detection area swept by the radiated ultrasonic wave fields is typically several times larger than the spacing of adjacent transducer units, and much larger than the distance of the exterior transducer units from one another. The system can monitor a semicircular area reliably, without rotating parts. The ultrasonic transducer units can be arranged very compactly to implement the fan-shaped radiating directions, the individual transducer units being inclined with respect to one another and/or being arranged along a curved forward-arched line.

In one embodiment of the invention, a least one portion of the ultrasonic transducer units are arranged in a plane along a circular-arc-shaped line, for example, along a semicircular line, so that a corresponding sector area can be monitored.

In a further embodiment of the invention, ultrasonic transducer units are provided in two planes situated above one another, such that the ultrasonic wave field of a respective transducer unit of one plane is situated between, and partially overlaps, the ultrasonic wave fields of two adjacent transducer units of the other plane. By means of an arrangement of this type, the directionally radiated ultrasonic wave fields of the individual transducer units can comparatively homogeneously and completely sweep over a sector-shaped area. It is understood that the distance between adjacent transducer units situated on different planes is expediently comparatively narrow, as is the distance between adjacent transducer units on the same plane.

In another advantageous embodiment of the invention, each transducer unit of one plane is inclined or angled with respect to a pertaining transducer unit of the other plane about a normal axis and, as required, without any offsetting, is positioned such that its radiating direction is in each case situated in the center between the radiating directions of two adjacent transducer units of the other plane. This arrangement achieves a very homogeneous and complete ultrasonic wave coverage of the detection area.

In another advantageous embodiment, a reference wire is assigned to each transducer unit at a comparatively small distance, for the purpose of carrying out a function test. The analysis unit is configured, among other things, to detect ultrasonic waves which are deflected by the respective reference wires. It evaluates the presence of the reference wire waves as a prerequisite of a disturbance-free operation of the system. This prevents the system from being disabled in an unauthorized manner, for example, by plugging up the outlet areas of the transducer units. Furthermore, the presence of the reference wire waves supplies exact information concerning the state of a respective assigned electronic transmitting and receiving system.

By means of another embodiment of the invention, different desired surveillance distances (that is, surveillance areas of different sizes) can be implemented easily in that, while the ultrasonic wave radiation by the transducer units remains the same, a respective maximal transit time of reflected ultrasonic waves can be indicated in a variable manner in the analysis unit. Reflected ultrasonic waves whose transit time after the emission of an ultrasonic pulse by the transducer units is longer than the pertaining, variably predeterminable maximal transit time are not taken into account for the surveillance area or are at most treated differently than those whose transit time is shorter than the selected maximal transit time. As required, several surveillance areas with a different monitoring or warning intensity can therefore be defined, such as a near-field area with a high warning or protecting intensity and a remote-field area which adjoins toward the outside and has a lower warning intensity.

Other objects, advantages and novel features of the present invention will become apparent from the following detailed description of the invention when considered in conjunction with the accompanying drawings.

DETAILED DESCRIPTION OF THE DRAWINGS

Figure 1:
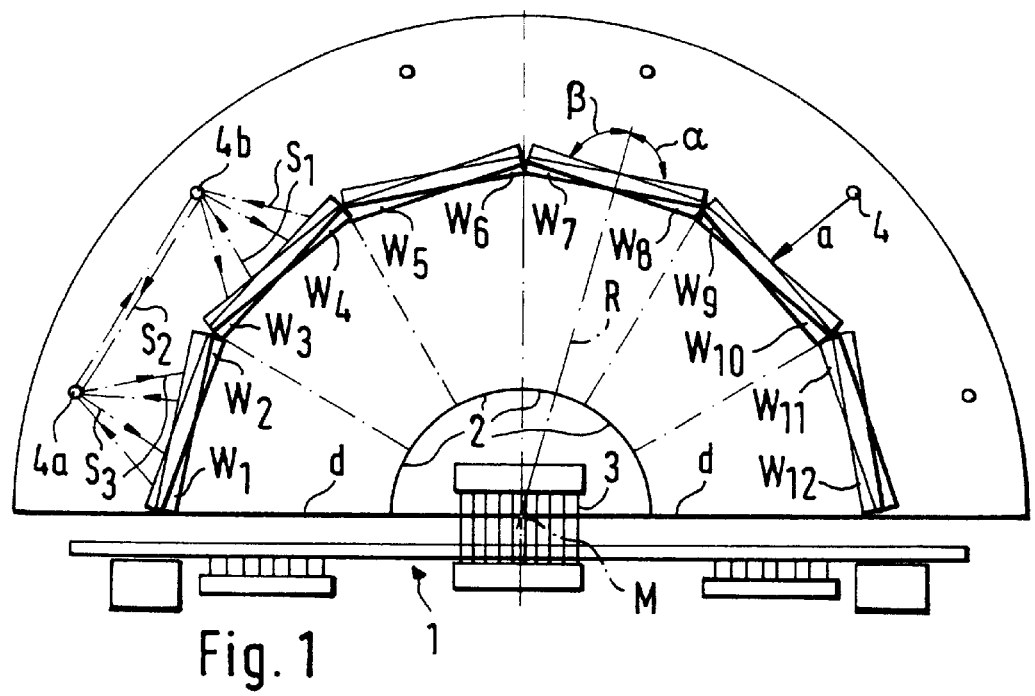
FIG. 1 is a schematic top view of an ultrasound area surveillance system with twelve transducer units which are arranged in a semicircular pattern and distributed on two planes to provide a semicircular detection area.

The ultrasound area surveillance system illustrated in FIG. 1 contains an analysis device 1 and an arrangement 2 of twelve ultrasonic transducer units ($W_1$ to $W_{12}$) which are arranged in a semicircular manner in two planes. Specifically, in this arrangement, six transducer units ($W_1$, $W_3$, $W_5$, $W_7$, $W_9$, $W_{11}$) are positioned in a lower plane along a semicircular line virtually without gaps, directly next to one another, while the other six transducer units ($W_2$, $W_4$, $W_6$, $W_8$, $W_{10}$, $W_{12}$) are placed directly above (that is, are not staggered or offset in the lateral or circumferential direction relative to) the pertaining transducer units of the lower plane, along a corresponding semicircular line in an upper plane situated above it. In this manner, the arrangement 2 with the ultrasonic transducer units ($W_1$ to $W_{12}$) is implemented compactly, on one side of a pertaining diametrical plane (d). The diameter of the semicircular transducer arrangement 2 may measure, for example, between only 140 mm and 170 mm.

Each transducer unit ($W_1$ to $W_{12}$) is conventionally designed for the directional radiation of a lobar ultrasonic wave field, and for receiving reflected ultrasonic waves. A separate transmitting and receiving circuit is assigned to each transducer unit ($W_1$ to $W_{12}$) This permits parallel operation of all transducer units ($W_1$ to $W_{12}$) which, in comparison to serial operation, allows a significant reduction of the reaction time to obstacles which are encountered. By way of connection lines 3, the transmitting and receiving circuits are connected with the analysis device 1 for triggering of the corresponding ultrasonic transducer unit ($W_1$ to $W_{12}$) to emit a respective ultrasonic wave pulse, and for delivering the ultrasonic waves received by the transducer unit to the analysis device 1.

The ultrasonic transducer units ($W_1$ to $W_{12}$) are positioned so that their radiation directions extend to the outside in a fan-shaped manner with a radial main component. In order to cover a semicircular detection area as uniformly and completely as possible with ultrasonic waves, two transducer units respectively situated above one another are inclined about a common normal axis (perpendicular to the two planes of the transducer units $W_1$ to $W_{12}$), in opposite rotating directions with respect to one another and with respect to the common tangent plane on the semicircular line. As shown in FIG. 1 for two representative transducer units ($W_5$, $W_6$), the outlet planes of the transducer units of the lower plane enclose an angle ($\alpha$) relative to the common radius (R), which is smaller than 90°; and analogously, the outlet planes of the transducer units of the upper plane, enclose an angle ($\beta$) which is also smaller than 90° relative to he common radius (R). The outlet planes of two transducer units respectively situated above one another therefore enclose an inclination angle of 180°-$\alpha$-$\beta$. As an example, this inclination angle may measure approximately 15°.

By virtue of this positioning, the ultrasonic wave field radiated by an ultrasonic transducer unit of the upper plane is situated between the ultrasonic wave fields radiated by the transducer unit situated below it and by a transducer unit which is adjacent to it on the lower plane. As a result, the ultrasonic wave fields radiated by the upper transducer units cover gap areas of the ultrasonic wave fields radiated by the transducer units of the lower plane alone. (The latter ultrasonic wave fields are the result of the diverging radiation directions of the transducer units of a plane and of the lobar shape of the ultrasonic wave field emitted by each transducer unit, at larger distances.) To the extent that the ultrasonic wave fields of the transducer units of the lower plane, on the one hand, and those of the transducer units of the upper plane, on the other hand, cover a particular near field area twice, a redundancy exists which increases the reliability and the safety of the system with respect to the recognition of objects in this near-field area.

As an alternative (or in addition) to the shown inclination of two ultrasonic transducer units respectively situated above one another, the transducer units of one plane may be arranged along the semicircle in the center, offset with respect to the transducer units of the other plane; in this manner, each lobar ultrasonic wave field of the transducer units of one plane is situated approximately in the center between two ultrasonic wave fields of the transducer units of the other plane and partially overlaps with these at least up to a certain distance. The detection area within this distance is thus covered without gaps by ultrasonic waves.

By means of a conventional learning process, the system learns in an initial operating phase the ultrasonic reflections which are caused by its surroundings and do not indicate objects to be detected. It stores this information in an analysis device 1 as a background with which the ultrasonic wave reflections received in the subsequent operation are compared for the purpose of recognizing objects.

A reference wire is assigned to each transducer unit ($W_1$ to $W_{12}$). For simplicity, one such reference wire is designated by reference number 4 in FIG. 1. This reference wire 4 is in each case situated at a distance (a) of less than 30 mm (for example, between 20 mm and 25 mm) in front of the outlet plane of the pertaining ultrasonic transducer unit. The compact construction of the transducers 2 is not impaired by the selection of such a narrow distance which is significantly smaller than the diameter of the transducer arrangement 2. When the system is switched on, and before each measuring cycle (whose repetition frequency is typically in the order of ten times per second), the analysis device 1 carries out a function test, during which each ultrasonic transducer unit ($W_1$ to $W_{12}$) generates an ultrasonic test pulse and the analysis device 1 determines where a corresponding signal is received by each reference wire 4. If not (because, for example, the outlet planes of one or several ultrasonic transducer units $W_1$ to $W_{12}$ were covered up in an unauthorized manner, or because one of the transducer units $W_1$ to $W_{12}$ is defective), the analysis device 1 concludes that there is a malfunction and emits a corresponding disturbance information. In the above-mentioned typical repetition frequency of ten times per second, the disturbance information, even in the least favorable case, will already be emitted approximately 0.1 s after the occurrence of a defect.

Because of the narrow distance (a) of the respective reference wires 4 from the pertaining ultrasonic transducer units ($W_1$ to $W_{12}$), the expected reference wire ultrasonic echo may be received by the receiver portion of the transducer units already within a time period in which post-pulse oscillations of the ultrasonic wave pulse previously emitted by the transmitter part still exist; and it is virtually impossible to distinguish between the reference wire echoes and such post-pulse oscillations. The invention therefore also provides a reliable function test with the given short distance (a) of the reference wire 4.

In the test process, two adjacent transducer pairs, formed by two transducer units respectively arranged above one another, are operated alternately as receivers and transmitters. The start of such a function test is illustrated in FIG. 1, in which each transmission of one transducer pair ($W_3$, $W_4$) emits a short ultrasonic wave pulse ($S_1$). On the reference wire 4b, which is situated opposite the transmitting transducer pair ($W_3$, $W_4$), these waves experience a diffuse reflection as the result of the law of refraction. A portion ($S_2$) of the waves deflected approximately in parallel to the surface of the transmitting transducer pair ($W_3$, $W_4$) impinges on that reference wire 4a which is situated opposite a transducer pair ($W_1$, $W_2$) adjacent to the transmitting transducer pair ($W_3$, $W_4$). At this reference wire 4a, a portion ($S_3$) of the impinging waves is deflected by approximately 90° such that it impinges essentially vertically on the surface of the opposite receiving transducer units ($W_1$, $W_2$). A certain portion of the ultrasonic waves emitted by a respective transducer of the transmitting transducer pair ($W_3$, $W_4$) therefore reaches the transducer of the adjacent transducer pair ($W_1$, $W_2$) which is positioned on the same lower or upper plane.

The analysis unit 1 will subsequently test this pulse transmission sequence from the respective transducer of the one transducer pair ($W_3$, $W_4$) to the transducer of the other transducer pair ($W_1$, $W_2$) situated on the same plane. For this purpose, at several points in time distributed over a predetermined time window, it performs a point by point temporal comparison of the received echo envelope curve with a filed reference echo envelope curve empirically determined in a known manner during a disturbance-free operation. In the next process step, the transmitting and receiving sequence will be reversed; that is, the previously receiving transducer pair ($W_1$, $W_2$) will now function as a transmitting pair, while the previously transmitting transducer pair ($W_3$, $W_4$) will now function as a receiver pair. This will be continued until all transducer units ($W_1$ to $W_{12}$) have been tested in this manner with respect to their function as a transmitter or as a receiver.

Since the respective ultrasonic transducer units ($W_1$ to $W_{12}$) never operate simultaneously as a transmitter and receiver in this process, the function test is not impaired by the post-pulse oscillations of the transducer units in the transmitting operation. In order to be able to carry out a function test which is as efficient as possible, the amplitude of the transmission pulse ($S_1$) is selected such that the pulse ($S_3$) received after the double reference wire deflection is approximately equal in amplitude to that echo pulse amplitude which is generated by obstacles in the area of the maximal surveillance distance.

Figure 2:
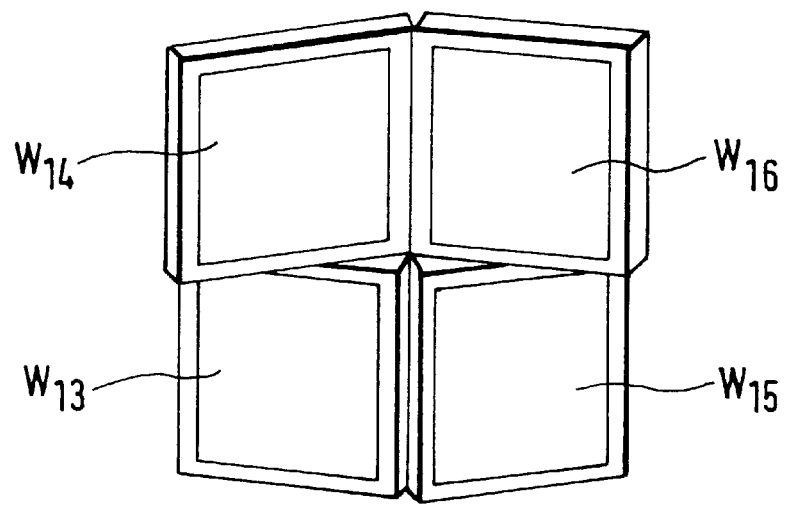
FIG. 2 is a broken away schematic lateral view of an arrangement of ultrasonic transducer units which varies from that of FIG. 1.

FIG. 2 is a broken away view of two pairs of transducers which illustrates a possible modification of the transducer arrangement 2 of FIG. 1. As in FIG. 1, in this modification, ultrasonic transducer units, (four of which $W_{13}$ to $W_{16}$ are shown in a representative manner), are arranged above one another (not offset) and inclined relative to each other, in two planes. Preferably in each plane, they are arranged along a forward-arched line. However, in this modified transducer arrangement, adjacent pairs of transducer units ($W_{13}$, $W_{14}$; $W_{15}$, $W_{16}$) arranged above one another are inclined oppositely with respect to their pertaining tangent plane. Thus, the outlet planes of the two lower illustrated transducer units ($W_{13}$, $W_{15}$) enclose a reflex angle, as in FIG. 1, while, in contrast, the outlet planes of the two upper transducer units ($W_{14}$, $W_{16}$) enclose an angle of less than 180°. As a result, the ultrasonic wave fields of the two upper transducer units ($W_{14}$, $W_{16}$) cover a center portion, and the ultrasonic wave fields of the two lower transducer units ($W_{13}$, $W_{15}$) cover the lateral portions of the area detected by these four transducer units.

Figure 3:
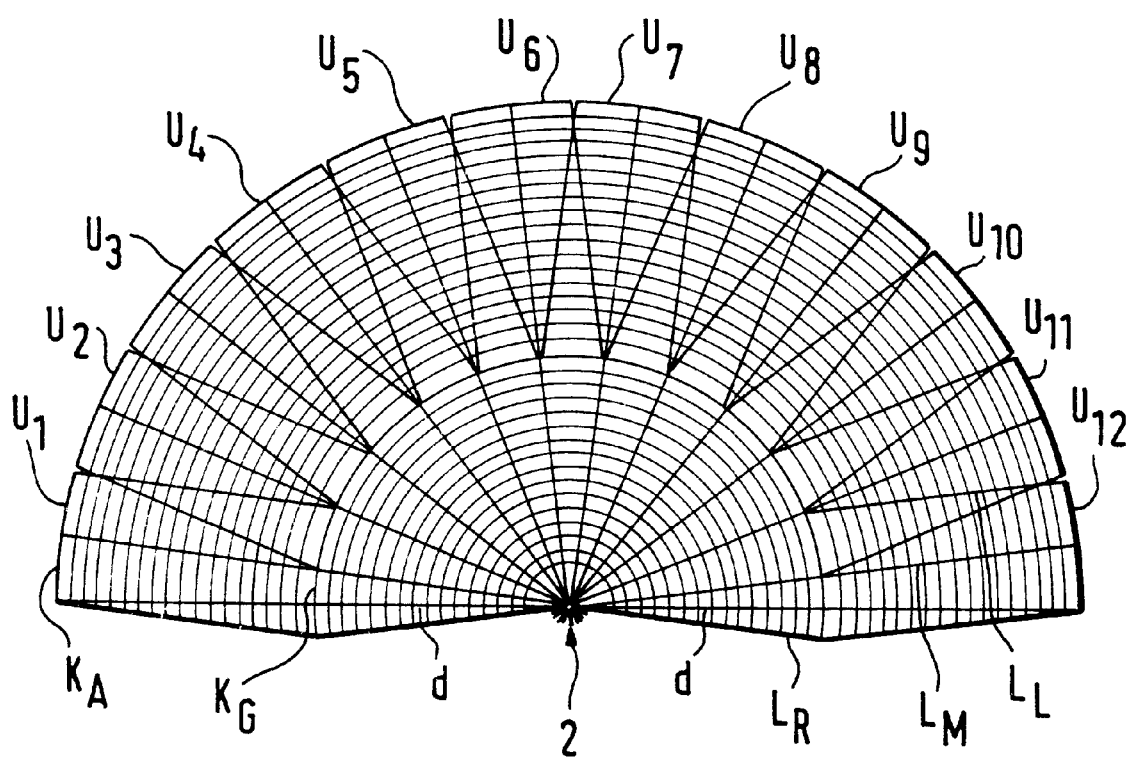
FIG. 3 is a schematic top view of the complete ultrasonic wave field radiated by the system of FIG. 1.

FIG. 3 illustrates the ultrasonic wave field for the surveillance area which can be generated by the transducer arrangement 2 according to FIG. 1. As illustrated in this figure, each transducer unit radiates lobar ultrasonic wave fields ($U_1$ to $U_{12}$) which, in FIG. 3, are schematically framed by a left-side boundary ray ($L_L$) and a right-side boundary ray ($L_R$), shown in FIG. 3 only for wave field $U_{12}$, with a central longitudinal ray ($L_M$) characterizing the respective radiation direction. In this case, the numbering of the ultrasonic wave lobes ($U_1$ to $U_{12}$) corresponds to that of the transducer units ($W_1$ to $W_{12}$) of FIG. 1. This means that adjacent ultrasonic wave lobes originate from adjacent transducer units of which one is positioned in one plane and the other is positioned in the other plane of the transducer arrangement 2.

The lobe shape of the directionally radiated ultrasonic wave fields ($U_1$ to $U_{12}$) is achieved in a conventional manner by funnel-shaped reflector attachments, which are not shown in detail, and which are situated in front of the outlet planes of the transducer units. It is understood that the dimension of the ultrasonic wave lobes ($U_1$ to $U_{12}$) in the normal axis direction perpendicular to the plane of projection of FIG. 3 can also be adjusted in a desirable manner as a function of the selected shape of the reflector funnel. As illustrated in FIG. 3, within a near-field area which extends to a semicircle boundary line ($K_G$), each ultrasonic wave lobe overlaps by means of its left half completely with the right half of the ultrasonic wave lobe adjoining on the left and overlaps by means of its right half completely with the left half of an ultrasonic wave lobe adjoining on the right. Thus, this near-field area is covered completely redundantly with monitoring ultrasonic waves so that object recognition will still be possible without gaps, even if one of the transducer units does not work properly.

The near-field area preferably represents a protection field with a high warning intensity; that is, upon recognition of an object within this near-field area, a correspondingly high-priority warning indication takes place. If the system is used in connection with the controlling of a pertaining machine, by means of the high-priority warning indication, for example, by way of a protective switching device, a protective switch-off of this machine can take place. Within a semicircular remote-field area adjoining the near field, the mutual overlapping of adjacent ultrasonic wave lobes diminishes successively radially to the outside until, at the level of a remote-field end line ($K_A$), there will be no more overlapping. A dimension of the monitored area which goes beyond this end line ($K_A$) is usually no longer expedient because gaps would occur between adjacent ultrasonic wave lobes. When an object is recognized in this ring-shaped remote-field area, a lower-priority warning indication takes place which, for example, does not result in a protective switching off of a machine.

In a correspondingly adapted manner, the analysis device is designed such that only those reflected ultrasonic waves which are received by the transducer units within a predetermined maximal transit time after the generation of a respective ultrasonic pulse by the transducer units, are analyzed for obstacle recognition. The maximal transit times for the near-field area and the remote-field area are selected such that only those objects which are situated within the concerned area are just barely still recognized. The maximal remote-field transit time can be selected for the analysis device in a variable manner by the user so that, as required, object recognition can be limited to a smaller semicircular area to be monitored or can be expanded to a surveillance area which extends farther to the outside while certain surveillance gaps are accepted. In the same manner, the limit between the near field monitored at a higher priority and the remote field monitored at a lower priority, if desired, can be adjusted to be variable by means of a corresponding change of the pertaining maximal near-field transit time. As an alternative to this measure, the monitored area can also be changed by causing the analysis device to control the ultrasonic transducer units for radiating ultrasonic wave lobes with a variable range. Also the radiation characteristics of the ultrasonic transducer units can be changed by providing different radiation funnel attachments.

As indicated in FIG. 3, the radial dimension of the detection area consisting of the near field and of the remote field corresponds to a multiple of the radial dimension of the transducer arrangement 2. Typically, for example, the transducer arrangement 2 with a diameter of between approximately 140 mm and 170 mm, covers a semicircular area of a diameter of approximately 8 m. In addition to its compact construction, the system also requires no mechanically movable parts, and can be programmed easily to define variable protection or warning field areas.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An ultrasound area surveillance system, comprising:
    a plurality of ultrasonic transducer units, each of which is configured for directional radiation of an ultrasonic wave field, and for receiving reflected ultrasonic waves; and
    an analysis device which analyzes reflected ultrasonic waves received by the ultrasonic transducer units to detect objects situated within a predeterminable surveillance area; wherein,
        the ultrasonic transducer units are arranged adjacently, having radiation directions that extend outwardly in a fan-shaped manner;
        at least a first portion of the ultrasonic transducer units is arranged in a first plane along a first convex circular line;
        a second portion of the ultrasonic transducer units is arranged in a second plane situated above the first plane, along a second convex circular line corresponding to the first such line; and
        an ultrasonic wave field directionally radiated from a particular ultrasonic transducer unit of the second portion is situated between and partially overlaps ultrasonic wave fields directionally radiated by two adjacent ultrasonic transducer units of the first portion.

2. The ultrasound area surveillance system according to claim 1 wherein each ultrasonic transducer unit of the second plane is arranged above a respective ultrasonic transducer unit of the first plane such that its radiation direction with respect to that of the ultrasonic transducer unit of the first plane situated underneath is inclined by a predeterminable angle about an axis that is perpendicular to the two planes.

3. The ultrasound area surveillance system according to claim 2 wherein a reference wire is assigned to each ultrasonic transducer unit and is situated at a distance of less than 30 mm in front thereof, whereby in a function test, ultrasonic waves transmitted by a first transducer unit are successively deflected by two reference wires respectively and are received by a second transducer unit, are recognized by the analysis device and are evaluated as a prerequisite for a no-disturbance system operation.

4. An ultrasound area surveillance system, comprising:
    a plurality of ultrasonic transducer units, each of which is configured for directional radiation of an ultrasonic wave field, and for receiving reflected ultrasonic waves; and
    an analysis device which analyzes reflected ultrasonic waves received by the ultrasonic transducer units to detect objects situated within a predeterminable surveillance area; wherein,
        the ultrasonic transducer units are arranged adjacently, having radiation directions that extend outwardly in a fan-shaped manner; and
        a reference wire is assigned to each ultrasonic transducer unit and is situated at a distance of less than 30 mm in front thereof, whereby in a function test, ultrasonic waves transmitted by a first transducer unit are successively deflected by two reference wires respectively and are received by a second transducer unit, are recognized by the analysis device and are evaluated as a prerequisite for a no-disturbance system operation.

* * * * *